US012680662B2

(12) United States Patent
Kito et al.

(10) Patent No.: US 12,680,662 B2

(45) Date of Patent: Jul. 14, 2026

(54) VEHICLE HEADLAMP

(71) Applicant: KOITO MANUFACTURING CO., LTD., Tokyo (JP)

(72) Inventors: Masanori Kito, Shizuoka (JP); Hidetada Tanaka, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 19/026,513

(22) Filed: Jan. 17, 2025

(65) Prior Publication Data

US 2025/0251107 A1 Aug. 7, 2025

(30) Foreign Application Priority Data

Feb. 2, 2024 (JP) ................................ 2024-015122

(51) Int. Cl.

*F21S 41/663* (2018.01)
*F21S 41/148* (2018.01)

(Continued)

(52) U.S. Cl.

CPC ........... *F21S 41/663* (2018.01); *F21S 41/148* (2018.01); *F21S 41/25* (2018.01); *F21W 2102/135* (2018.01); *F21Y 2115/10* (2016.08)

(58) Field of Classification Search

CPC ......... F21W 2102/16; F21W 2102/145; B60Q 2300/41; B60Q 2300/42; B60Q 2300/45; B60Q 1/143; B60Q 2300/056; B60Q 1/14; B60Q 1/1423; B60Q 1/085; B60Q 2300/054; B60Q 1/1407; F21S 41/663; F21S 41/148; F21S 41/143; F21S 41/153; F21S 41/321; F21S 41/141; F21Y 2115/10; F21Y 2103/10; F21Y 2105/10; F21Y 2105/14; F21Y 2115/00; F21V 19/001;

(Continued)

(56) References Cited

U.S. PATENT DOCUMENTS

2008/0253141 A1 10/2008 Nakada et al.

FOREIGN PATENT DOCUMENTS

CN 115371011 A * 11/2022 ............. F21S 41/00
CN 220321117 U * 1/2024

(Continued)

OTHER PUBLICATIONS

Search English translation of WO 2022131139 A1 (Year: 2022).*
Search English translation of CN 115371011 A (Year: 2022).*
Search English translation of CN-220321117-U (Year: 2024).*

*Primary Examiner* — Omar Rojas Cadima

(74) *Attorney, Agent, or Firm* — LICA, Inc.

(57) ABSTRACT

A vehicle headlamp that is mounted on a vehicle and forms a light distribution pattern including a low-beam light distribution pattern includes first irradiator that irradiates a first light distribution pattern that is a portion of the low-beam light distribution pattern, and a second irradiator that irradiates a second light distribution pattern that is a portion of the low-beam light distribution pattern, at least a portion of the second light distribution pattern being located above the first light distribution pattern. A first G-value at an upper end of the first light distribution pattern is 0.25 or more and 0.35 or less, and a second G-value at an upper end of the second light distribution pattern is 0.25 or more and 0.35 or less.

12 Claims, 9 Drawing Sheets

(51) Int. Cl.

| | |
|---|---|
| ***F21S 41/25*** | (2018.01) |
| *F21W 102/135* | (2018.01) |
| *F21Y 115/10* | (2016.01) |

(58) Field of Classification Search

CPC ...... H05B 45/44; H05B 45/325; H05B 39/02; H05B 47/155

See application file for complete search history.

(56) References Cited

FOREIGN PATENT DOCUMENTS

| | | | | |
|---|---|---|---|---|
| JP | 2008-262755 A | 10/2008 | | |
| WO | WO-2022131139 A1 * | 6/2022 | ............. | B60Q 1/143 |

* cited by examiner

VEHICLE HEADLAMP

CROSS-REFERENCE TO RELATED APPLICATIONS

This application is based on and claims priority from Japanese Patent Application No. 2024-015122, filed on Feb. 2, 2024, with the Japan Patent Office, the disclosure of which is incorporated herein in its entirety by reference.

TECHNICAL FIELD

The present disclosure relates to a vehicle headlamp.

BACKGROUND

Japanese Patent Laid-Open Publication No. 2008-262755 discloses a vehicle lighting device capable of achieving a low-beam light distribution pattern that is easy to see, by suitably blurring the bright-dark boundary of a cutoff line while preventing the G-value from increasing beyond the statutory reference value.

As in Japanese Patent Laid-Open Publication No. 2008-262755, there is a need to form an easy-to-see low-beam light distribution pattern by blurring the cutoff line, while there is also a need to increase the illuminance of the low-beam light distribution pattern near the cutoff line to some extent. However, when the illuminance of the low-beam light distribution pattern near the cutoff line is too high, it becomes difficult to blur the cutoff line. Therefore, conventional vehicle headlamps still have room for improvement from the viewpoint of balancing both of the needs.

SUMMARY

The present disclosure provides a vehicle headlamp that may form a light distribution pattern with good visibility and suppress a reduction in the illuminance of a low-beam light distribution pattern near a cut-off line.

According to one aspect of the present disclosure, a vehicle headlamp that is mounted on a vehicle and forms a light distribution pattern including a low-beam light distribution pattern, includes first irradiator that irradiates a first light distribution pattern that is a portion of the low-beam light distribution pattern, and a second irradiator that irradiates a second light distribution pattern that is a portion of the low-beam light distribution pattern, at least a portion of the second light distribution pattern being located above the first light distribution pattern, in which a first G-value at an upper end of the first light distribution pattern is 0.25 or more and 0.35 or less, and a second G-value at an upper end of the second light distribution pattern is 0.25 or more and 0.35 or less.

With the above configuration, the first G-value at the upper end of the first light distribution pattern formed by the first irradiator, is 0.25 or more and 0.35 or less, and the second G-value at the upper end of the second light distribution pattern formed by the second irradiator, is 0.25 or more and 0.35 or less. The light distribution pattern with such illuminance is moderately blurred overall and does not have a stark bright-dark contrast, which minimizes discomfort for viewers of of the light distribution pattern. Accordingly, the low-beam light distribution pattern formed by the vehicle headlamp according to the above configuration has good visibility. Further, at least a portion of the second light distribution pattern is located above the first light distribution pattern, which may suppress the low-beam light distribution pattern from becoming excessively dark. Consequently, the vehicle headlamp according to the above configuration may form a light distribution pattern with good visibility and suppress a reduction in the illuminance of the low-beam light distribution pattern near a cut-off line.

According to the present disclosure, it is possible to provide a vehicle headlamp that may form a light distribution pattern with good visibility and suppress a reduction in the illuminance of a low-beam light distribution pattern near a cut-off line.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
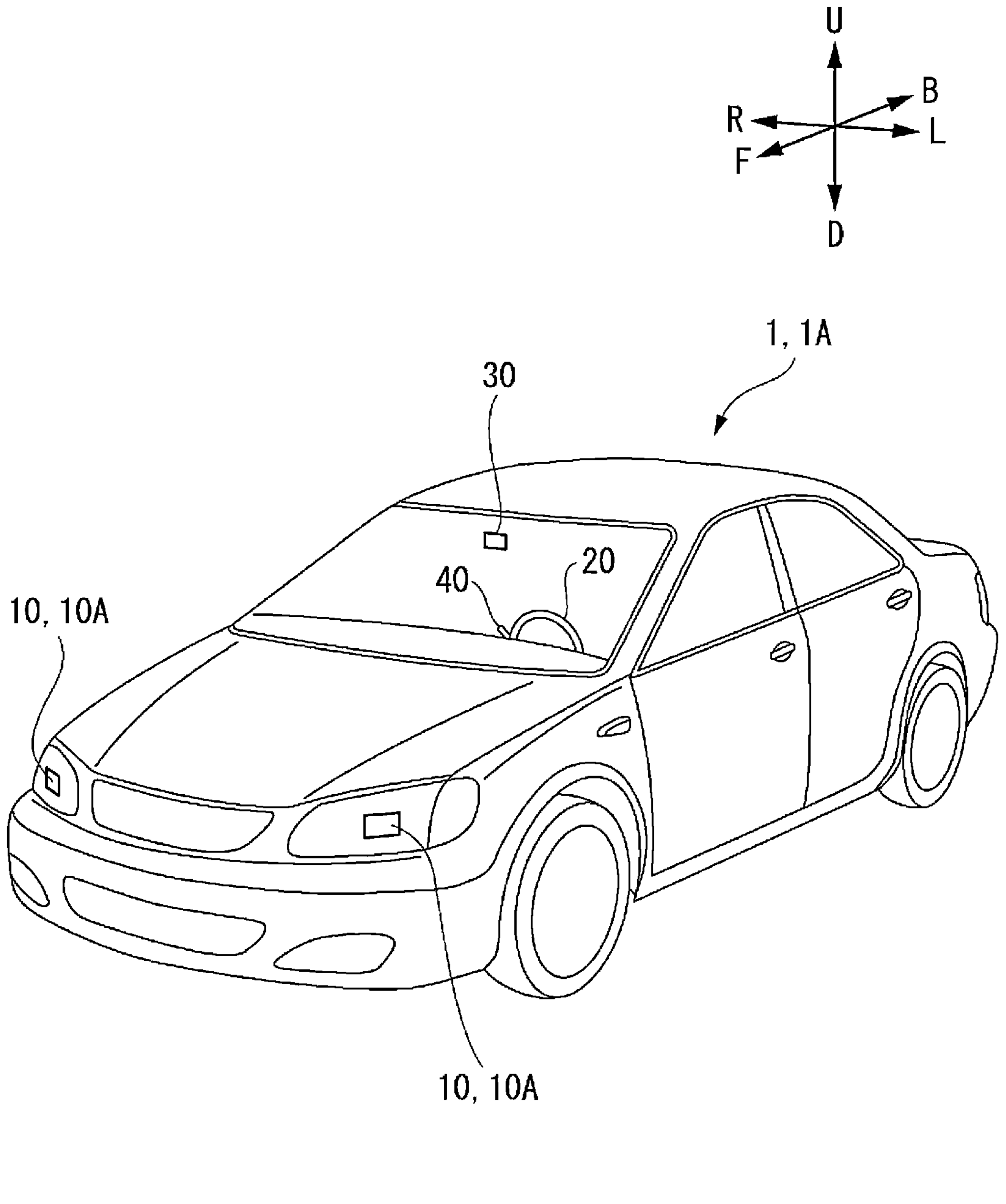
FIG. 1 is a perspective view of a vehicle equipped with a vehicle headlamp according to an embodiment of the present disclosure (hereinafter, simply referred to as “the present embodiment”).

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, the present embodiments will be described with reference to the drawings. The dimensions of each member illustrated in these drawings may differ from the actual dimensions of each member for the convenience of description.

Further, in the description of the present embodiment, terms “left-right direction,” “up-down direction,” and “front-back direction” may be appropriately mentioned for the convenience of description. These directions are relative directions set for a vehicle 1 illustrated in FIG. 1. Here, the “left-right direction” includes both “left direction” and “right direction” and also refers to the width direction of the vehicle 1. The “up-down direction” includes both the “upward direction” and the “downward direction.” The “front-back direction” includes both the “forward direction”

and the "backward direction." The front-back direction is orthogonal to both the left-right direction and the up-down direction. In addition, in each drawing, the reference character U indicates the upward direction. The reference character D indicates the downward direction. The reference character F indicates the forward direction. The reference character B indicates the backward direction. The reference character L indicates the leftward direction. The reference character R indicates the rightward direction.

First Embodiment

Figure 2:
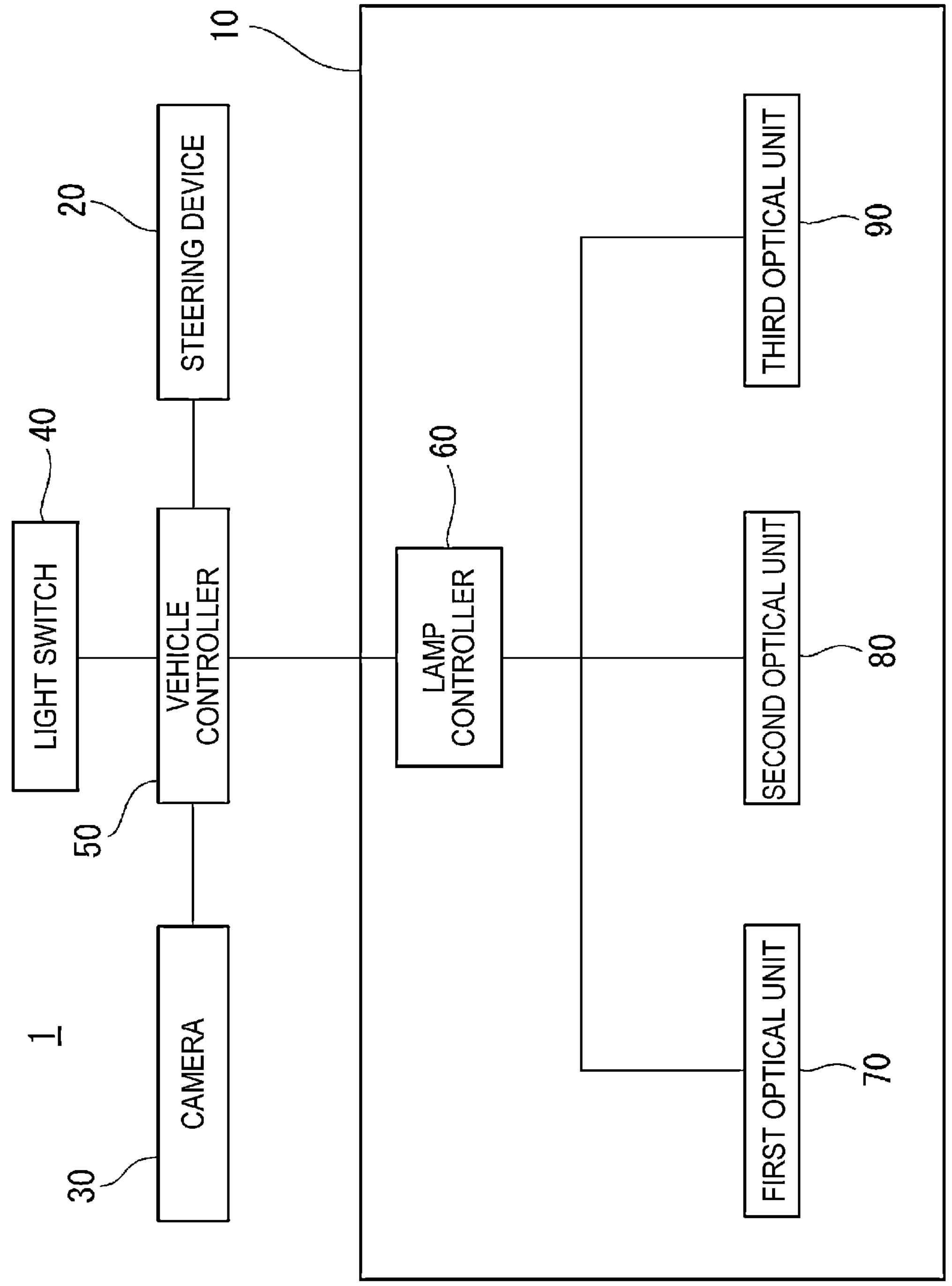
FIG. 2 is a block diagram of a system configuration including a vehicle headlamp according to a first embodiment.

First, a vehicle headlamp 10 according to the present embodiment will be described below with reference to FIGS. 1 to 4. FIG. 1 is a perspective view of the vehicle 1 equipped with the vehicle headlamp 10. FIG. 2 is a block diagram of a system configuration including the vehicle headlamp 10. The vehicle 1 is, for example, a vehicle (automobile) capable of traveling in a manual driving mode and/or an automatic driving mode.

As illustrated in FIGS. 1 and 2, the vehicle 1 is equipped with the headlamp 10, a steering device 20, a camera 30, a light switch 40, and a vehicle controller 50. The vehicle headlamp 10 is configured to form a low-beam light distribution pattern PL (see, e.g., FIG. 5) and a high-beam light distribution pattern PH (see, e.g., FIG. 6). As illustrated in FIG. 1, the vehicle headlamp 10 is mounted on each of the front right and front left sides of the vehicle 1. The steering device 20 is, for example, installed in the interior of the vehicle 1. The camera 30 is, for example, arranged near a windshield. The camera 30 is arranged between the vehicle headlamp 10 arranged on the front right side of the vehicle 1 and the vehicle headlamp 10 arranged on the front left side of the vehicle 1 in the width direction (e.g., left-right direction in FIG. 1) of the vehicle 1. The light switch 40 is, for example, installed near the steering device 20.

Figure 3:
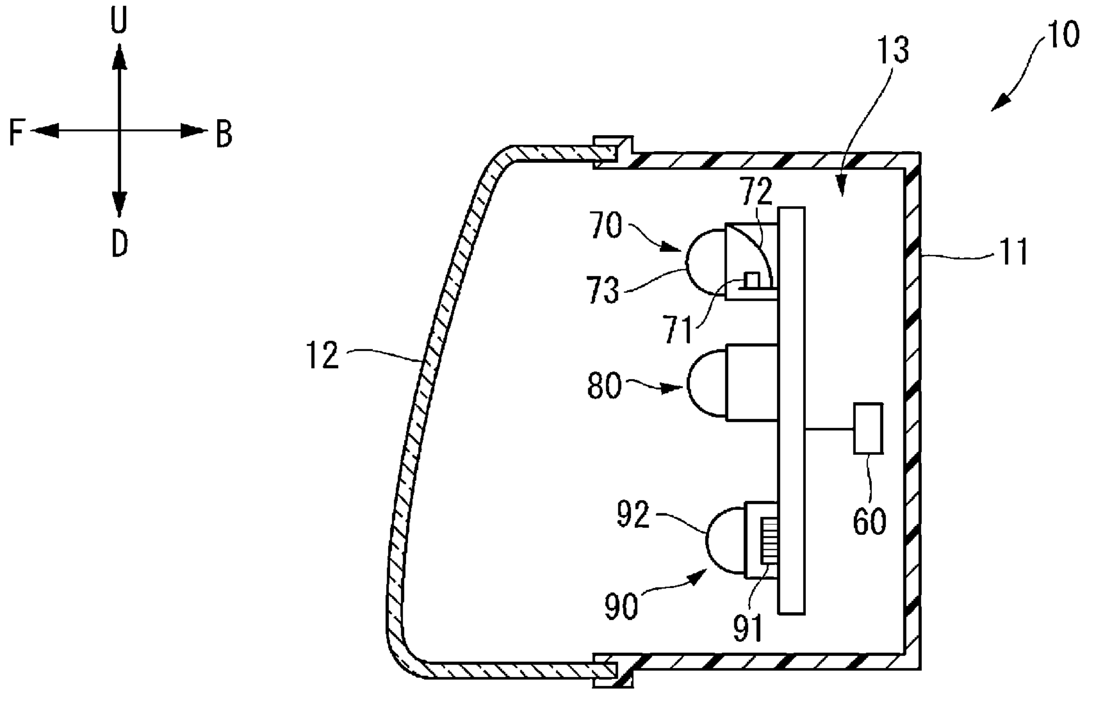
FIG. 3 is a cross-sectional view of the vehicle headlamp according to the first embodiment.

As illustrated in FIG. 2, the vehicle headlamp 10 includes a lamp controller 60, a first optical unit 70 (e.g., a first irradiator), a second optical unit 80 (e.g., a second irradiator), and a third optical unit 90 (e.g., a third irradiator). Further, as illustrated in FIG. 3, the vehicle headlamp 10 includes a lamp body 11 having an opening at the front of the vehicle headlamp 10 and a light-transmitting outer cover 12 that covers the opening of the lamp body 11. The lamp controller 60, first optical unit 70, second optical unit 80, and third optical unit 90 are accommodated inside a lamp chamber 13 formed by the lamp body 11 and the outer cover 12.

Returning to FIG. 2, the steering device 20 will be described. The steering device 20 is composed, for example, of a steering wheel and others.

The camera 30 is a camera that includes an imaging device such as a charge-coupled device (CCD) or complementary MOS (CMOS). The camera 30 acquires imaging data by capturing images of the surroundings of the vehicle 1 (e.g., the front of the vehicle 1). The camera 30 outputs the imaging data to the vehicle controller 50.

The light switch 40 is configured to switch the vehicle headlamp 10 on or off and to change a light distribution pattern to be projected, for example, based on an operation by a driver of the vehicle 1. The driver of the vehicle 1 may select whether to project the low-beam light distribution pattern PL or the high-beam light distribution pattern PH by operating the light switch 40. When the driver of the vehicle 1 operates the light switch 40, the light switch 40 generates an instruction signal to project a light distribution pattern based on the operation, and transmits the instruction signal to the vehicle controller 50.

The vehicle controller 50 is configured to control the traveling of the vehicle 1. The vehicle controller 50 is composed, for example, of at least one electronic control unit (ECU). The electronic control unit includes, for example, a computer system including one or more processors and one or more memories as well as an electronic circuit including active elements such as transistors and passive elements.

The vehicle controller 50 is configured to analyze the imaging data output from the camera 30. The vehicle controller 50 generates surrounding environment information indicating the surrounding environment of the vehicle 1 from the imaging data. The surrounding environment information includes, for example, positional information on a target object (e.g., an oncoming vehicle, a preceding vehicle, and a road sign) located in front of the vehicle 1. The positional information is, for example, an angular coordinate representing the orientation of the target object as seen from the vehicle 1. The vehicle controller 50 transmits the surrounding environment information to the lamp controller 60.

The vehicle controller 50 transmits a control signal for controlling the vehicle headlamp 10 to the lamp controller 60 based on instruction signals from the light switch 40, surrounding environmental information, and others. For example, when the driver of the vehicle 1 operates the light switch 40 to project the low-beam light distribution pattern PL, the vehicle controller 50 receives an instruction signal to project the low-beam light distribution pattern PL from the light switch 40 and transmits a control signal based on the instruction signal to the lamp controller 60. For example, when the driver of the vehicle 1 operates the light switch 40 to project the high-beam light distribution pattern PH (e.g., ADB light distribution pattern), the vehicle controller 50 receives an instruction signal to project the high-beam light distribution pattern PH from the light switch 40 and transmits a control signal based on the instruction signal and surrounding environment information to the lamp controller 60. In addition, the vehicle controller 50 calculates a non-irradiation area of an ADB light distribution pattern, which will be described later, based on the surrounding environment information.

The lamp controller 60 may have the same hardware configuration as that of the vehicle controller 50. The lamp controller 60 is configured to control the first optical unit 70, second optical unit 80, and third optical unit 90 based on control signals received from the vehicle controller 50.

The first optical unit 70 projects a first light distribution pattern P10 (see, e.g., FIG. 5), which is a portion of the low-beam light distribution pattern PL. In addition, the details of the first light distribution pattern P10 will be described later. As illustrated in FIG. 3, the first optical unit 70 includes, for example, at least one light source 71, a reflector 72, and a projection lens 73. The light source 71 may be composed, for example, of a light emitting diode (LED) element or laser diode (LD) element. The light source 71 is configured to emit light toward the reflector 72. The reflector 72 is configured to reflect the light emitted from the light source 71 toward the projection lens 73. The projection lens 73 is, for example, an aspherical lens with a convex front surface and a flat back surface. The projection lens 73 is made of a light-transmitting material, for example, a transparent resin such as acryl. The projection lens 73 is configured to project the light reflected by the reflector 72 onto an area in front of the vehicle 1.

The second optical unit 80 projects a second light distribution pattern P20 (see, e.g., FIG. 5), which is a portion of the low-beam light distribution pattern PL. In addition, the details of the second light distribution pattern P20 will be described later. As illustrated in FIG. 3, the second optical unit 80 includes a light source composed, for example, of an LED array. In addition, the LED array is, for example, a light source in which multiple micro-LED light-emitting elements are arranged in an array shape. The activated state of the multiple micro-LED light-emitting elements included in the second optical unit 80 may be changed independently of each other. In this case, the vehicle headlamp 10 may perform ON/OFF control and brightness adjustment for each micro-LED light-emitting element included in the second optical unit 80 under the control of the lamp controller 60.

The third optical unit 90 is capable of irradiating an area that includes at least an area above the cutoff line of the low-beam light distribution pattern PL with light and is capable of dimming any area within the irradiated area. In addition, the term "dimming" in this specification includes each of blocking at least a portion of light emitted from the third optical unit 90 and reducing the intensity of light emitted from the third optical unit 90. The third optical unit 90 is capable of projecting a third light distribution pattern P30 (see, e.g., FIG. 6), which is, for example, an adaptive drive beam (ADB) light distribution pattern. In addition, the ADB light distribution pattern is a type of high-beam light distribution pattern that does not irradiate an area where a target object such as a preceding vehicle or oncoming vehicle is present with light and that varies a non-irradiation area based on the presence or absence and position of the target object.

The third optical unit 90 includes a light source 91 and a projection lens 92. The light source 91 may be composed, for example, of multiple micro-LED light-emitting elements. The activated state of the multiple micro-LED light-emitting elements included in the light source 91 may be changed independently of each other. In other words, the vehicle headlamp 10 may perform ON/OFF control and brightness adjustment for each micro-LED light-emitting element included in the light source 91 under the control of the lamp controller 60. The projection lens 92 may have, for example, the same configuration as that of the projection lens 73.

Figure 4:
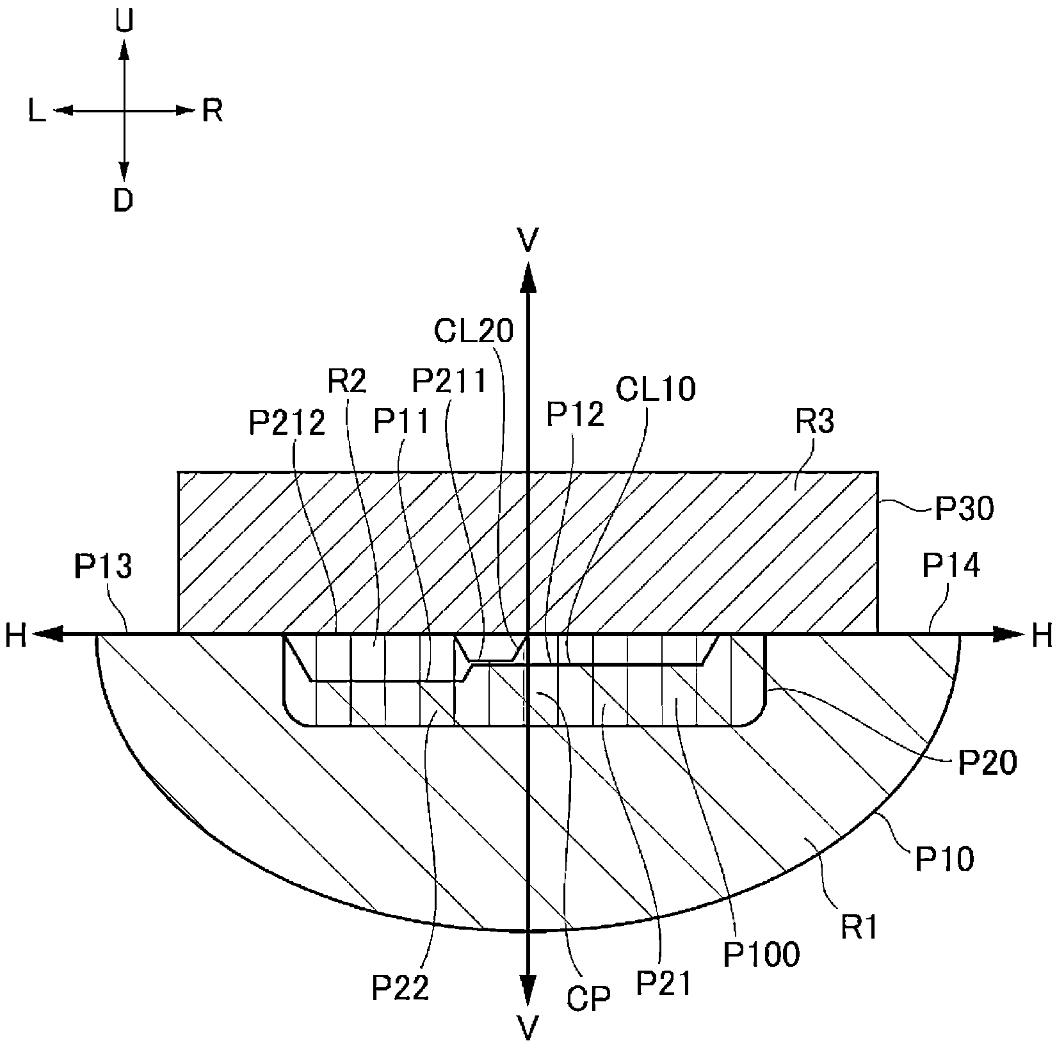
FIG. 4 is a diagram illustrating each light distribution pattern projected by the vehicle headlamp.

Here, the first light distribution pattern P10 projected from the first optical unit 70, the second light distribution pattern P20 projected from the second optical unit 80, and the third light distribution pattern P30 projected from the third optical unit 90 will be described with reference to FIG. 4. In addition, in the present embodiment, a case where the vehicle 1 is traveling in a right lane will be described. Further, the first light distribution pattern P10, the second light distribution pattern P20, and the third light distribution pattern P30, illustrated in FIG. 4 represent a projection state onto a virtual vertical screen at a predetermined position in front of the vehicle 1 (e.g., at a position of 25 meters in front of the vehicle 1). In addition, as for light distribution patterns illustrated in the subsequent drawings, each pattern represents a projection state onto a virtual vertical screen at a predetermined position in front of the vehicle 1. Further, in FIG. 4, the vertical direction (e.g., up-down direction in FIG. 4) of the irradiation range center of the vehicle headlamp 10 is indicated by the V-V line, and the horizontal direction (e.g., left-right direction in FIG. 4) orthogonal to the V-V line is indicated by the H-H line. In addition, in the subsequent drawings illustrating light distribution patterns, the vertical direction of the irradiation range center of the vehicle headlamp 10 is indicated by the V-V line, and the horizontal direction perpendicular to the V-V line is indicated by the H-H line.

As illustrated in FIG. 4, the first light distribution pattern P10 is projected onto a first irradiation area R1 (e.g., the area hatched with diagonal lines slanting downward to the right in FIG. 4) that spreads in the width direction (e.g., left-right direction in FIG. 1) of the vehicle 1. The first light distribution pattern P10 is projected along the H-H line or below the H-H line.

An upper end of the first light distribution pattern P10 has three upper end portions with different vertical positions. When the first light distribution pattern P10 is horizontally divided into a central area located near the V-V line, a left area located to the left of the central area, and a right area located to the right of the central area, the upper ends of the left and right areas extend linearly in the horizontal direction. The vertical position of an upper end portion P13 in the left area of the first light distribution pattern P10 and the vertical position of an upper end portion P14 in the right area of the first light distribution pattern P10 are equal to each other. The central area of the first light distribution pattern P10 includes an upper end portion P11 and an upper end portion P12 with different vertical positions. Both the upper end portions P11 and P12 in the central area of the first light distribution pattern P10 are located below the H-H line.

The upper end portions P11 and P12 of the upper end of the first light distribution pattern P10, located near the line V-V, are positioned lower than other portions (e.g., the upper end portion P13). The upper end portion P11 is positioned to the left (e.g., on the opposing lane side) of the upper end portion P12. The upper end portion P11 is positioned lower than upper end portion P12.

A cutoff line CL10 is formed on the upper end of the central area of the first light distribution pattern P10. The cutoff line CL10 is composed of the upper end portion P11 that extends in the horizontal direction, the upper end portion P12 that is positioned higher than the upper end portion P11 and extends in the horizontal direction, and a portion that slants upward to the right and interconnects the upper end portions P11 and P12. The upper end portion P12 intersects with the V-V line.

The second light distribution pattern P20 is projected onto a second irradiation area R2 (e.g., the area hatched with vertical lines in FIG. 4), which includes an area above at least a portion of an upper end of the first irradiation area R1. A portion of the second light distribution pattern P20 overlaps with a central portion CP of the first light distribution pattern P10 in the left-right direction. In addition, the central portion CP refers to a portion of the first light distribution pattern P10 near the V-V line.

The second light distribution pattern P20 includes a first portion P21 on the vehicle own lane side from the V-V line and a second portion P22 located to the left (e.g., on the opposing lane side) from the V-V line. An upper end of the second light distribution pattern P20 has a downwardly concave shape at a central upper end portion (e.g., a portion near the V-V line and located to the left (e.g., on the opposing lane side) of the V-V line). In other words, an upper end portion P211 of the second portion P22 near the V-V line is located lower than other portions (e.g., an upper end portion P212) Specifically, the upper end of the second portion P22 includes the upper end portion P211 near the V-V line and the upper end portion P212 located to the left of the upper end portion P211. The upper end portion P211 is located lower than the upper end portion P212. In addition, the vertical position of the upper end portion P212 is equal to the vertical position of the upper end of the first portion P21 of the second light distribution pattern P20 located on the vehicle own lane side from the V-V line.

The second light distribution pattern P20 overlaps with the cutoff line CL10 of the first light distribution pattern P10. In addition, in the present embodiment, an overlapping portion (e.g., the portion hatched with both diagonal lines slanting downward to the right and vertical lines in FIG. 5) of the first light distribution pattern P10 and the second light distribution pattern P20 is designated by P100. In the present embodiment, a cutoff line CL20 of the second light distribution pattern P20 either overlaps with, or is positioned higher than the cutoff line CL10 of the first light distribution pattern P10.

The third light distribution pattern P30 forms a so-called high-beam light distribution pattern along with the first light distribution pattern P10. The third optical unit 90 irradiates a third irradiation area R3 (e.g., the area hatched with diagonal lines slanting upward to the right in FIG. 4), which includes at least an area above a cutoff line CL1 (see, e.g., FIG. 6) of the low-beam light distribution pattern PL, with the third light distribution pattern P30. In the present embodiment, the third optical unit 90 is adapted to project an ADB light distribution pattern. Therefore, any area within the third light distribution pattern P30 may be dimmed.

Figure 5:
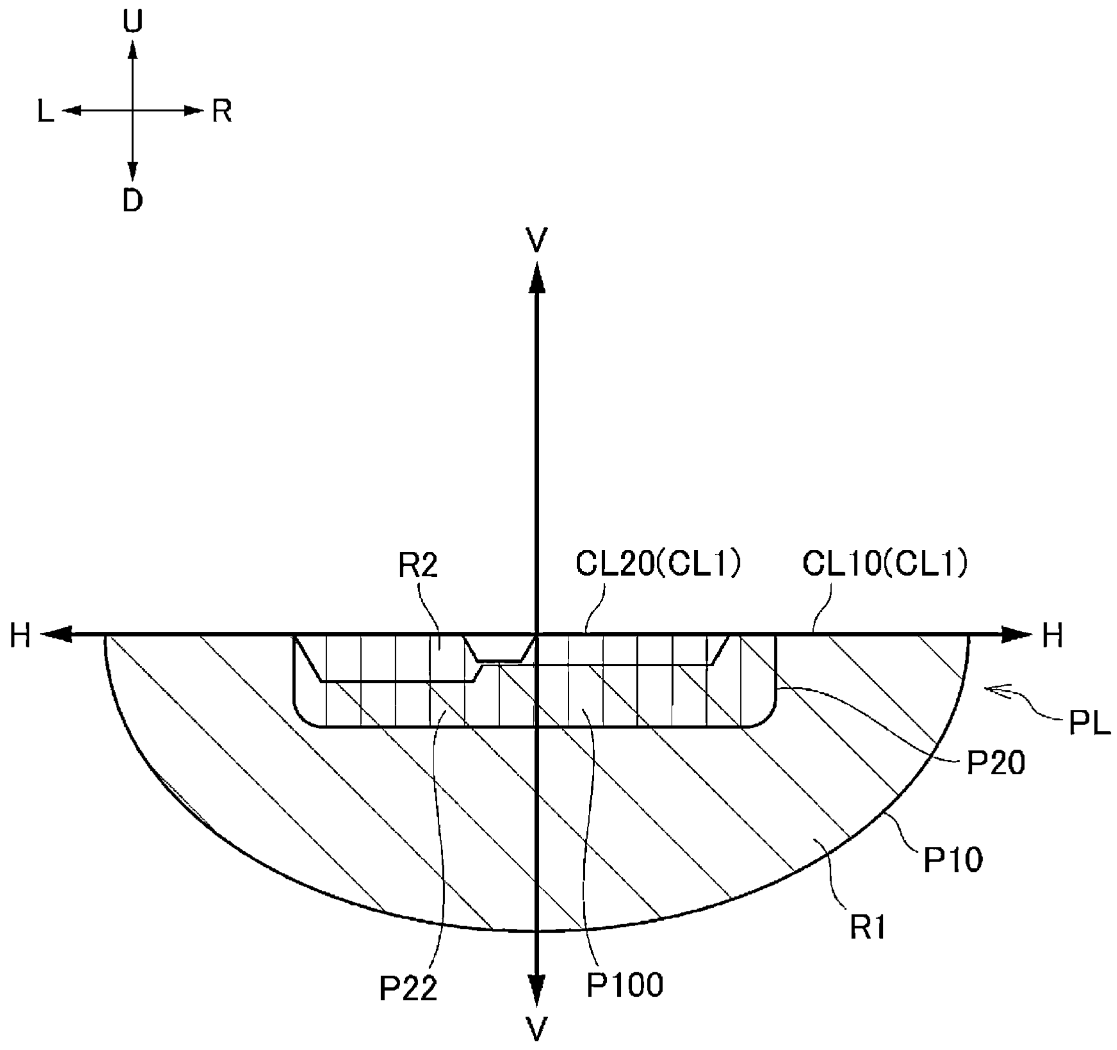
FIG. 5 is a diagram illustrating a low-beam light distribution pattern during low beam activation.
Figure 6:
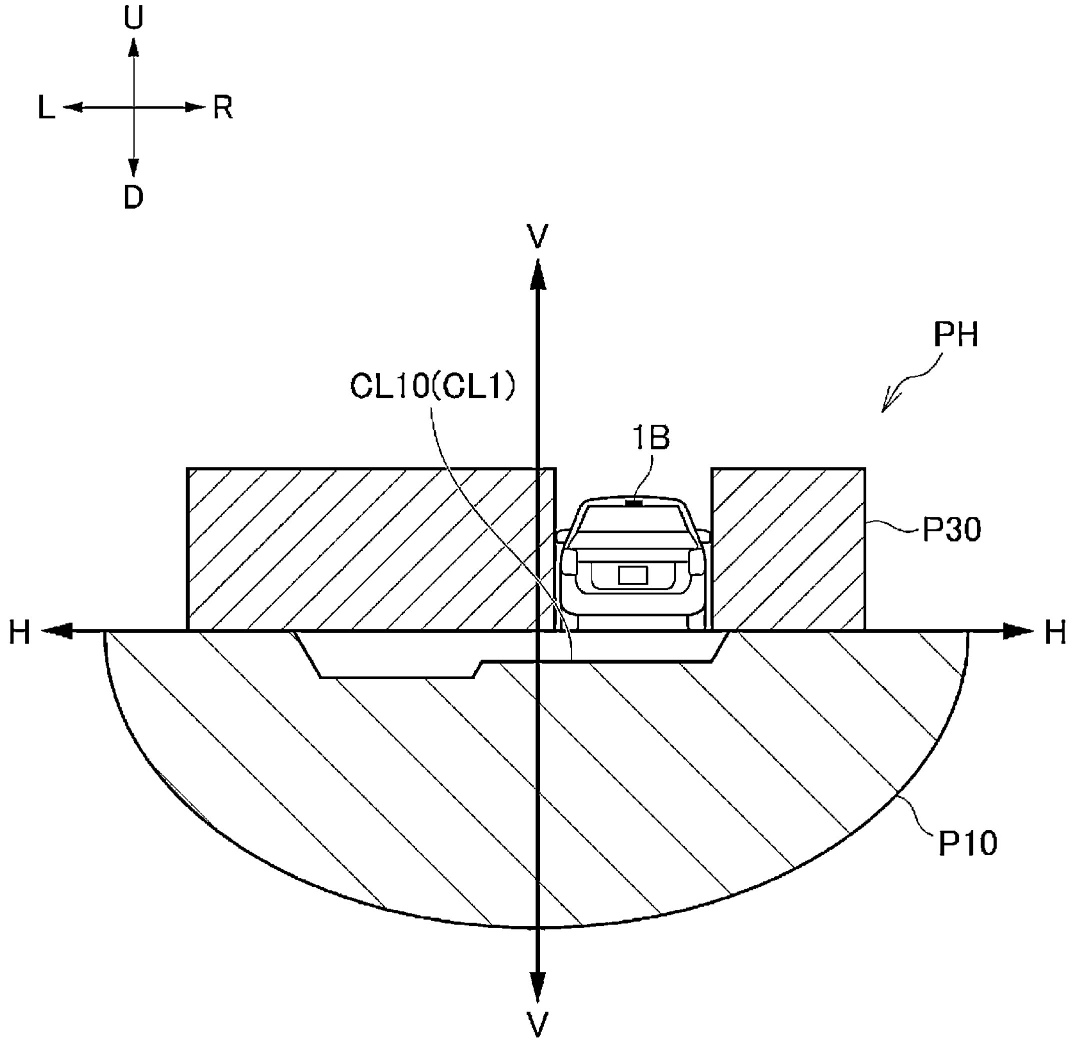
FIG. 6 is a diagram illustrating a high-beam light distribution pattern during high beam activation.

Next, the low-beam light distribution pattern PL projected from the vehicle headlamp 10 during low beam activation and the high-beam light distribution pattern PH projected from the headlamp 10 during high beam activation will be respectively described with reference to FIGS. 5 and 6. In addition, low beam activation refers to an operation when the driver of the vehicle 1 operates the light switch 40 to project the low-beam light distribution pattern PL. High beam activation refers to an operation when the driver of the vehicle 1 operates the light switch 40 to project the high-beam light distribution pattern PH. FIG. 5 is a diagram illustrating the light distribution pattern PL during low beam activation. FIG. 6 is a diagram illustrating the light distribution pattern PH during high beam activation. In addition, the projected high-beam light distribution pattern PH in the present embodiment is an ADB light distribution pattern.

As illustrated in FIG. 5, during low-beam activation, the vehicle headlamp 10 turns ON the first optical unit 70 and the second optical unit 80, thereby projecting the low-beam light distribution pattern PL composed of the first light distribution pattern P10 and the second light distribution pattern P20. The overlapping portion P100 of the first and second light distribution patterns P10 and P20 is brighter than a portion with only the first light distribution pattern P10 or the second light distribution pattern P20 as well as a portion with neither the first light distribution pattern P10 nor the second light distribution pattern P20. Further, the cutoff line CL1 of the low-beam light distribution pattern PL corresponds to either the cutoff line CL10 of the first light distribution pattern P10 or the cutoff line CL20 of the second light distribution pattern P20.

As illustrated in FIG. 6, during high beam activation, the vehicle headlamp 10 turns ON the first optical unit 70 and the third optical unit 90, thereby projecting the high-beam light distribution pattern PH composed of the first light distribution pattern P10 and the third light distribution pattern P30.

In the example illustrated in FIG. 6, since there is a preceding vehicle 1B in front of the vehicle 1, the camera 30 outputs imaging data related to the preceding vehicle 1B to the vehicle controller 50. The vehicle controller 50 generates surrounding environment information including positional information on the preceding vehicle 1B based on the imaging data output from the camera 30 and transmits the surrounding environment information to the lamp controller 60. The lamp controller 60 controls the third optical unit 90 so as not to emit light toward the preceding vehicle 1B based on the surrounding environment information received from the vehicle controller 50. Therefore, an area around the preceding vehicle 1B is shaded in the example illustrated in FIG. 6.

Next, the blurriness of the cutoff line CL1 will be described. The blurriness of the cutoff line CL1 may be represented in terms of a luminance gradient. In addition, in the present embodiment, the blurriness of the cutoff line CL1 will be described using a numerical value called the G-value, which represents the luminance gradient. Here, the luminance gradient of the cutoff line CL1 of the low-beam light distribution pattern PL according to the present embodiment will be described using a first G-value G1 and a second G-value G2 with reference to FIG. 7.

Figure 7:
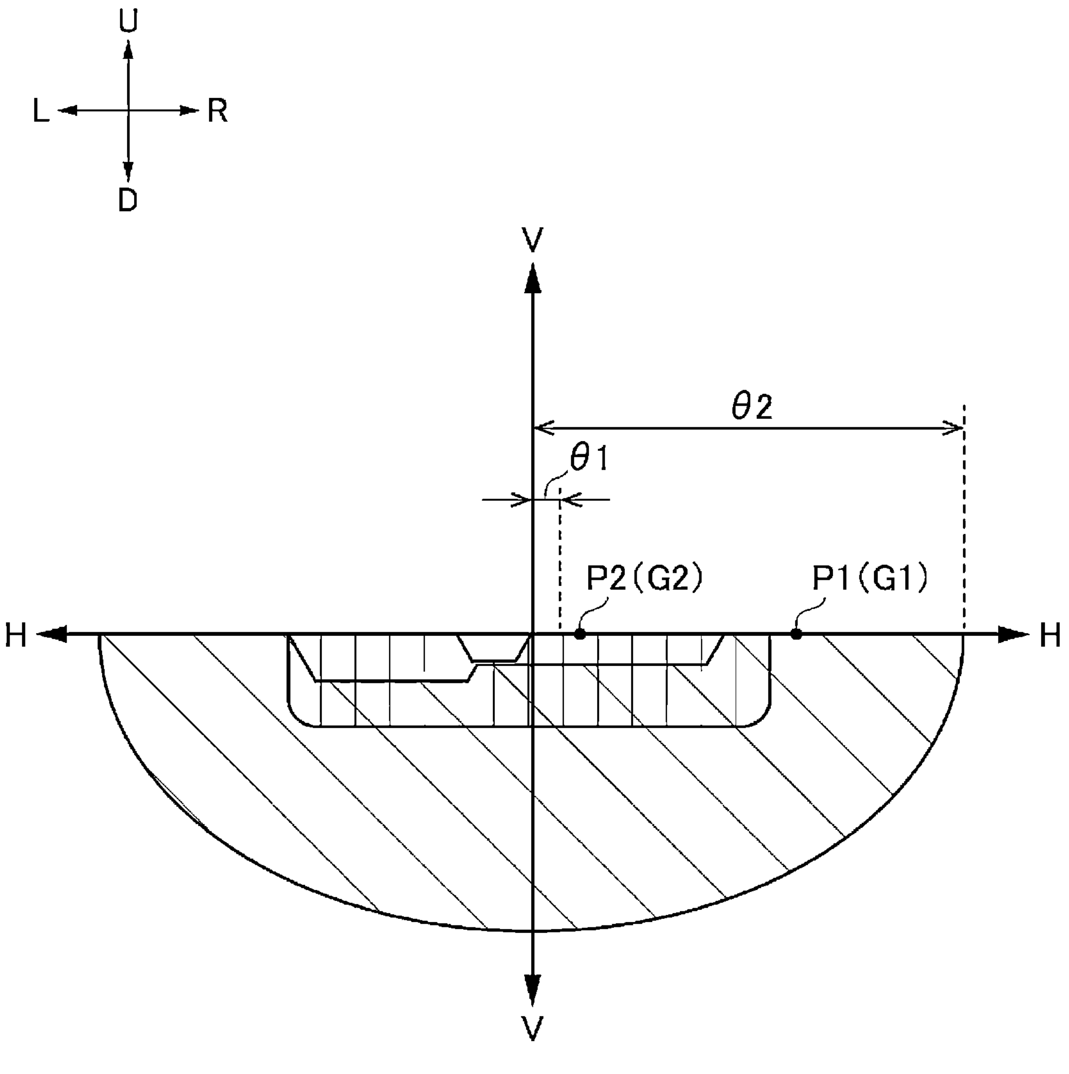
FIG. 7 is a diagram illustrating a state where a cut-off line is blurred.

Position P1 in FIG. 7 is a reference position when measuring the luminance gradient of the cutoff line CL10 of the first light distribution pattern P10. In FIG. 7, position P2 is a reference position when measuring the luminance gradient of the cutoff line CL20 of the second light distribution pattern P20. Both positions P1 and P2 are located within a horizontal range to the right from the front of the vehicle headlamp 10 (e.g., to the right of an angle θ1 and to the left of an angle θ2) and are any positions on the H-H line. A first G-value G1, which is the luminance gradient at position P1, is calculated using the following equation (1). In addition, E(a1) represents the illuminance at position P1. E(a1+0.1) represents the illuminance at a position with a vertical angle of 0.1 degrees above position P1.

$$G1 = \log E(a1) - \log E(a1 + 0.1) \quad \text{Equation (1)}$$

A second G-value G2, which is the luminance gradient at position P2, is calculated using the following equation (2). In addition, E(a2) represents the illuminance at position P2. E(a2+0.1) represents the illuminance at a position with a vertical angle of 0.1 degrees above position P2.

$$G2 = \log E(a2) - \log E(a2 + 0.1) \quad \text{Equation (2)}$$

In the present embodiment, the first G-value G1 calculated from the above equation (1) is 0.25 or more and 0.35 or less. The second G-value G2 calculated from the above equation (2) is 0.25 or more and 0.35 or less. In addition, in the present embodiment, the second G-value G2 is equal to or less than the first G-value G1. Thus, the G-value for the cutoff line CL1 of the low-beam light distribution pattern PL is 0.25 or more and 0.35 or less. On the other hand, a general low-beam light distribution pattern is formed by blocking some light, resulting in a distinct brightness difference along the cutoff line, and a G-value for the cutoff line of a general low-beam light distribution pattern is approximately 0.4. Therefore, the cutoff line CL1 of the low-beam light distribution pattern PL according to the present embodiment, with a G-value of less than 0.4 (e.g., 0.25 or more and 0.35 or less), appears more blurred compared to the cutoff line of a general low-beam light distribution pattern.

Further, the lower the G-value at the cutoff line of the low-beam light distribution pattern, the darker the upper end of the low-beam light distribution pattern becomes. However, the illuminance in the overlapping portion P100 of the first and second light distribution patterns P10 and P20 remains relatively high. Accordingly, in the low-beam light distribution pattern PL, while the cutoff line CL1 is appropriately blurred, the overlapping portion P100 of the low-beam light distribution pattern PL, which requires high visibility, remains bright.

In the meantime, there is a need to form an easy-to-see low-beam light distribution pattern by blurring the cutoff line, while there is also a need to increase the illuminance of the low-beam light distribution pattern near the cutoff line to some extent. However, when the illuminance of the low-beam light distribution pattern near the cutoff line is too high, it becomes difficult to blur the cutoff line. Therefore, conventional vehicle headlamps still had room for improvement from the viewpoint of balancing both the needs.

According to the vehicle headlamp 10 having the above configuration, the first G-value G1 at the upper end of the first light distribution pattern P10 formed by the first optical unit 70 is 0.25 or more and 0.35 or less, and the second G-value G2 at the upper end of the second light distribution pattern P20 formed by the second optical unit 80 is 0.25 or more and 0.35 or less. The light distribution pattern with such illuminance is moderately blurred overall and does not have a stark bright-dark contrast, which minimizes discomfort for viewers of the light distribution pattern. Therefore, the visibility of the low-beam light distribution pattern PL formed by the vehicle headlamp 10 is excellent. Further, at least a portion of the second light distribution pattern P20 is located above the first light distribution pattern, which suppresses the low-beam light distribution pattern from becoming excessively dark. Consequently, the vehicle headlamp 10 may form a light distribution pattern with good visibility and may suppress a reduction in illuminance near the cutoff line CL1 of the low-beam light distribution pattern PL.

Further, according to the vehicle headlamp 10 having the above configuration, a portion of the second light distribution pattern P20 overlaps with the central portion CP of the first light distribution pattern P10 in the left-right direction, making the central portion CP brighter. Therefore, the vehicle headlamp 10 may enhance the visibility of the low-beam light distribution pattern PL.

Further, according to the vehicle headlamp 10 having the above configuration, since the second light distribution pattern P20 overlaps with the cutoff line CL10 of the first light distribution pattern P10, the overlapping portion P100 of the first and second light distribution patterns P10 and P20 is bright. In the meantime, the G-value of the low-beam light distribution pattern PL is determined by either the first G-value G1 of the first light distribution pattern P10 or the second G-value G2 of the second light distribution pattern P20, which minimizes the likelihood of causing discomfort to the driver.

Further, according to the vehicle headlamp 10 having the above configuration, since the second light distribution pattern P20 includes the first portion P21 on the vehicle own lane side from the V-V line and the second portion P22 on the opposing lane side from the V-V line, the low-beam light distribution pattern PL projected by the vehicle headlamp 10 exhibits high road performance.

Further, according to the vehicle headlamp 10 having the above configuration, an upper end portion of the second portion P22 included in the second light distribution pattern P20 near the V-V line is positioned lower than other portions. Therefore, the vehicle headlamp 10 may project the low-beam light distribution pattern PL that suppresses unnecessary dimming while minimizing glare to oncoming vehicles.

Further, according to the vehicle headlamp 10 having the above configuration, since the second G-value G2 is equal to or less than the first G-value G1, the difference in brightness between a light distribution pattern irradiation area and an area located above the second light distribution pattern P20 within a light distribution pattern non-irradiation area may be kept relatively small. Therefore, the vehicle headlamp 10 may project the low-beam light distribution pattern PL that is less likely to cause discomfort to the viewer.

Further, according to the vehicle headlamp 10 having the above configuration, the first optical unit 70 and the third optical unit 90 are turned ON during high beam activation. The first optical unit 70 and the second optical unit 80 are turned ON during low beam activation. In other words, the second optical unit 80 is turned ON during low beam activation but is turned OFF during high beam activation. In this way, since the ON/OFF state of the second optical unit 80 is independent of the ON/OFF state of the first optical unit 70, the vehicle headlamp 10 may form an appropriate light distribution pattern depending on the situation. Further, since the first G-value G1 of the first light distribution pattern P10 is 0.25 or more and 0.35 or less and the first light distribution pattern is moderately blurred overall, the boundary between the first light distribution pattern P10 and the third light distribution pattern P30, which is projected by the third optical unit 90, is not clear. Therefore, the vehicle headlamp 10 may form a light distribution pattern with good visibility even during high beam activation when the first optical unit 70 is turned ON.

Second Embodiment

Figure 8:
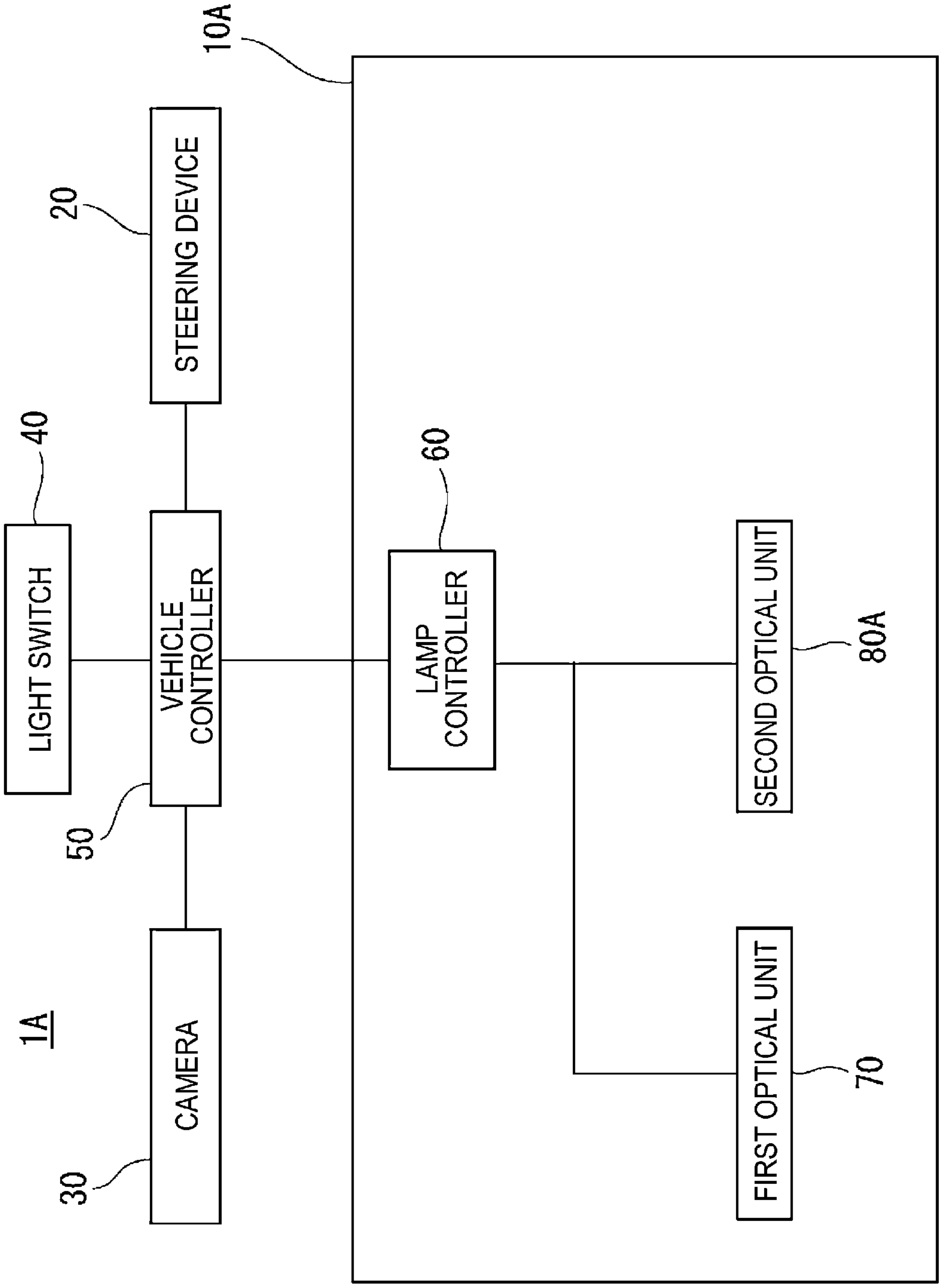
FIG. 8 is a block diagram of a system configuration including a vehicle headlamp according to a second embodiment.

Next, a second embodiment will be described with reference to FIGS. 4, 8 and 9. In addition, in the present embodiment, the same parts as those in the first embodiment are described using the same reference numerals, and descriptions of overlapping parts are omitted as appropriate. As illustrated in FIG. 8, a vehicle 1A according to the present embodiment is different from the vehicle 1 according to the first embodiment in that it includes a vehicle headlamp 10A instead of the vehicle headlamp 10. In addition, in the present embodiment, it is assumed that the vehicle 1 is traveling in a right lane.

As illustrated in FIG. 8, the vehicle headlamp 10A includes the lamp controller 60, the first optical unit 70, and a second optical unit 80A. In addition, the second optical unit 80A according to the present embodiment has the function of the second optical unit 80 according to the first embodiment and the function of the third optical unit 90 according to the first embodiment. In other words, in the present embodiment, the second optical unit 80 and the third optical unit 90 according to the first embodiment are integrated as a single optical unit (second optical unit 80A). Accordingly, in the present embodiment, the second optical unit 80A is an example of both the second irradiator and the third irradiator.

Figure 9:
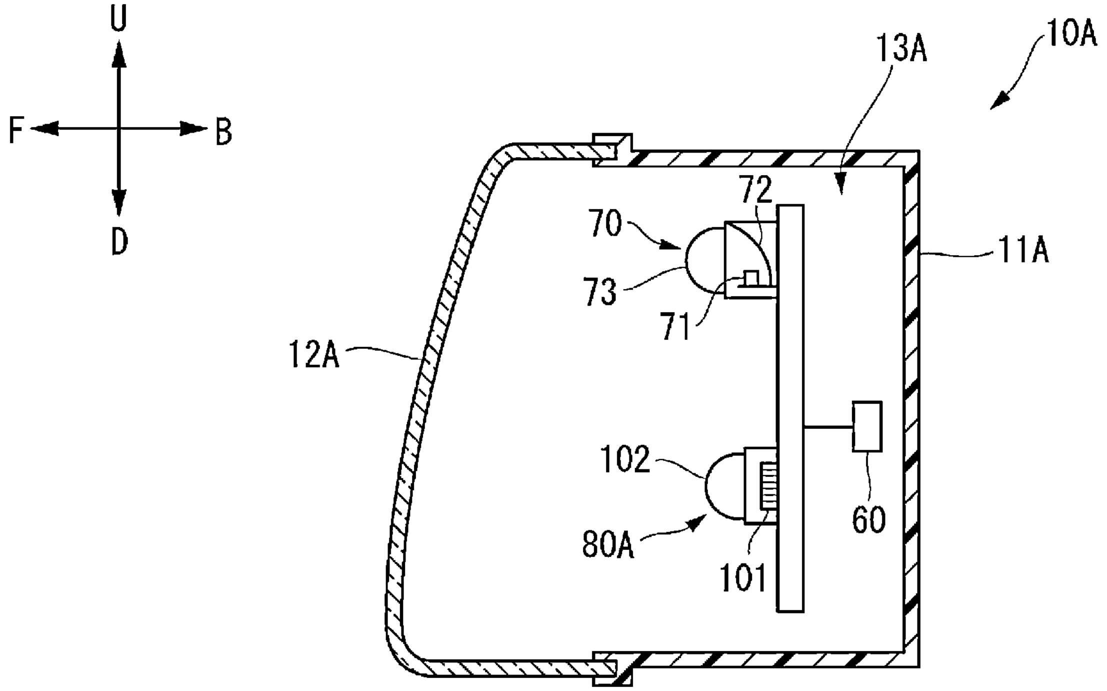
FIG. 9 is a cross-sectional view of the vehicle headlamp according to the second embodiment.

As illustrated in FIG. 9, the vehicle headlamp 10A includes a lamp body 11A with an opening at the front of the vehicle headlamp 10A and a light-transmitting outer cover 12A that covers the opening of the lamp body 11A. The lamp controller 60, first optical unit 70, and second optical unit 80A are accommodated inside a lamp chamber 13A formed by the lamp body 11A and the outer cover 12A.

The second optical unit 80A includes a light source 101 and a projection lens 102. The light source 101 may be composed, for example, of an LED array having multiple micro-LED light-emitting elements. In addition, when the light source 101 is composed of an LED array, the activated state of the multiple micro-LED light-emitting elements included in the light source 101 may be changed independently of each other. In other words, in this case, the vehicle headlamp 10A may perform ON/OFF control and brightness adjustment for each micro-LED light-emitting element included in the light source 101 under the control of the lamp controller 60.

The projection lens 102 may have, for example, the same configuration as that of the projection lens 73.

The second optical unit 80A may project the second light distribution pattern P20 and the third light distribution pattern P30 as illustrated in FIG. 4.

In the present embodiment, a low-beam light distribution pattern during low beam activation is the same as the low-beam light distribution pattern during low beam activation according to the first embodiment, i.e., the low-beam light distribution pattern PL illustrated in FIG. 5.

In the present embodiment, a high-beam light distribution pattern during high beam activation is the same as the high-beam light distribution pattern during high beam activation according to the first embodiment, e.g., the high-beam light distribution pattern PH illustrated in FIG. 6.

The vehicle headlamp 10A according to the present embodiment also provides the same effects as in the vehicle headlamp 10 according to the first embodiment.

The above embodiments have described cases where the vehicle 1 or 1A is traveling in a right lane, but the present disclosure may also be applied to cases where the vehicle 1 is traveling in a left lane.

The above embodiments have described cases where the preceding vehicle 1B is present in front of the vehicle 1 or 1A, but the present disclosure may also be applied to cases where an oncoming vehicle is present in front of the vehicle 1 or 1A.

In the above embodiments, the vehicle headlamp 10 may include a single optical unit capable of implementing the functions of the first optical unit 70, the second optical unit 80, and the third optical unit 90. In this case, the first optical unit 70, the second optical unit 80, and the third optical unit 90 may be configured as a common optical unit, thereby reducing the number of components.

In the above embodiments, the vehicle headlamp 10 may include the second optical unit 80 and an optical unit capable of implementing the functions of both the first optical unit 70 and the third optical unit 90. Further, the vehicle headlamp 10 may include the third optical unit 90 and an optical unit capable of implementing the functions of both the first optical unit 70 and the second optical unit 80. In these cases, the number of components may be reduced.

In the above embodiments, the first optical unit 70, the second optical unit 80 or 80A, and the third optical unit 90 may be composed, for example, of at least one light source, a driving mirror, and an optical system such as lenses and mirrors. The driving mirror may be composed of a digital mirror device (DMD) such as a micro electro mechanical system (MEMS) mirror or a rotating blade mirror.

In the above embodiments, the lamp controller 60 is installed in the vehicle headlamp 10 or 10A. However, the lamp controller 60 may be installed in the vehicle 1 or 1A instead of the vehicle headlamp 10 or 10A. In other words, the lamp controller 60 may be integrated into the vehicle controller 50.

In the above embodiments, the camera 30 is installed in the vehicle 1 or 1A. However, the camera 30 may be installed in the vehicle headlamp 10 or 10A instead of the vehicle 1 or 1A.

In the above embodiments, the second G-value is equal to or less than the first G-value. However, the second G-value may be greater than the first G-value. Further, the first G-value and the second G-value may be equal to each other.

In the above embodiments, a portion of the second light distribution pattern P20 overlaps with the central portion CP of the first light distribution pattern P10 in the left-right direction. However, it is also possible for the entire second light distribution pattern P20 to overlap with the central portion CP of the first light distribution pattern P10 in the left-right direction.

As described above, this specification discloses the following.

(1) A vehicle headlamp that is mounted on a vehicle and forms a light distribution pattern including a low-beam light distribution pattern, the headlamp including:

a first irradiator that irradiates a first light distribution pattern that is a portion of the low-beam light distribution pattern; and a second irradiator that irradiates a second light distribution pattern that is a portion of the low-beam light distribution pattern, at least a portion of the second light distribution pattern being located above the first light distribution pattern, in which a first G-value at an upper end of the first light distribution pattern is 0.25 or more and 0.35 or less, and a second G-value at an upper end of the second light distribution pattern is 0.25 or more and 0.35 or less.

(2) The vehicle headlamp described in (1), in which the at least a portion of the second light distribution pattern overlaps with a central portion of the first light distribution pattern in a left-right direction.

(3) The vehicle headlamp described in (1) or (2), in which the second light distribution pattern overlaps with a cutoff line of the first light distribution pattern.

(4) The vehicle headlamp described in any of (1) to (3), in which the second light distribution pattern includes a first portion on a vehicle own lane side from a V-V line and a second portion on an opposing lane side from the V-V line.

(5) The vehicle headlamp described in (4), in which a portion of an upper end of the second portion near the V-V line is positioned lower than a remaining portion.

(6) The vehicle headlamp described in any of (1) to (5), in which the second G-value is equal to or less than the first G-value.

(7) The vehicle headlamp described in any of (1) to (6), further including a third irradiator capable of irradiating an area including at least an area above a cutoff line of the low-beam light distribution pattern with light and capable of dimming any area within the irradiated area, in which during high beam activation, both the first irradiator and the third irradiator are turned ON, or the second irradiator is dimmed while both the first irradiator and the third irradiator are turned ON, and wherein during low beam activation, both the first irradiator and the second irradiator are turned ON.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle headlamp mounted on a vehicle and configured to form a light distribution pattern including a low-beam light distribution pattern, the headlamp including:

a first irradiator configured to irradiate a first light distribution pattern that is a first portion of the low-beam light distribution pattern; and a second irradiator configured to irradiate a second light distribution pattern that is a second portion of the low-beam light distribution pattern and is different from the first portion, at least a portion of the second light distribution pattern being located above the first light distribution pattern, wherein a first G-value, defined as a luminance gradient expressed in $cd/m^2$ per degree, at an upper end of the first light distribution pattern is 0.25 or more and 0.35 or less, a second G-value, defined as a luminance gradient expressed in $cd/m^2$ per degree, at an upper end of the second light distribution pattern is 0.25 or more and 0.35 or less, and a cutoff line of the second light distribution pattern overlaps with a cutoff line of the first light distribution pattern or is located above the cutoff line of the first light distribution pattern, and is located below an H-H line.

2. The vehicle headlamp according to claim 1, wherein the at least a portion of the second light distribution pattern overlaps with a central portion of the first light distribution pattern in a left-right direction.

3. The vehicle headlamp according to claim 1, wherein the second light distribution pattern overlaps with a cutoff line of the first light distribution pattern.

4. The vehicle headlamp according to claim 1, wherein the second light distribution pattern includes a first portion on a vehicle own lane side from a V-V line and a second portion on an opposing lane side from the V-V line.

5. The vehicle headlamp according to claim 4, wherein a portion of an upper end of the second portion near the V-V line is positioned lower than a remaining portion.

6. The vehicle headlamp according to claim 1, wherein the second G-value is equal to or less than the first G-value.

7. The vehicle headlamp according to claim 1, further comprising:

a third irradiator configured to irradiate an area including at least an area above a cutoff line of the low-beam light distribution pattern with light and configured to dim any area within the irradiated area, wherein during high beam activation, both the first irradiator and the third irradiator are turned ON, or the second irradiator is dimmed while both the first irradiator and the third irradiator are turned ON, and wherein during low beam activation, both the first irradiator and the second irradiator are turned ON.

8. The vehicle headlamp according to claim 1, wherein an upper end of the first light distribution pattern includes a plurality of upper portions having different vertical positions, wherein the first light distribution pattern includes, in a left-right direction, a central region located near a V-V line, a left region located on a left side of the central region, and a right region located on a right side of the central region, wherein upper portions of the left region and the right region extend linearly in a horizontal direction and are located at the same vertical position, and wherein the central region includes at least two upper portions having different vertical positions, both of which are located below an H-H line.

9. The vehicle headlamp according to claim 4, wherein an upper end of the second light distribution pattern has a downwardly concave shape in a region near a V-V line.

10. The vehicle headlamp according to claim 4, wherein the second portion includes a first upper part located near the V-V line and a second upper part located farther from the V-V line in a left-right direction, and wherein the first upper part is positioned lower than the second upper part.

11. The vehicle headlamp according to claim 4, wherein an upper end of the first portion of the second light distribution pattern on the vehicle own lane side is located at a same vertical position as an upper end of the second portion of the second light distribution pattern located farther from the V-V line.

12. The vehicle headlamp according to claim 1, wherein the first light distribution pattern and the second light distribution pattern overlap with each other to form an overlapping region in which light from both the first irradiator and the second irradiator is superposed.

* * * * *